3,246,996
CORROSION INHIBITOR
William R. Thompson and Samuel B. Baker, Sarnia, Ontario, Canada, assignors to Esso Research and Engineering Company, a corporation of Delaware
No Drawing. Filed June 26, 1962, Ser. No. 205,207
9 Claims. (Cl. 106—14)

This invention relates to novel rust and corrosion inhibitor compositions of matter and methods for the prevention of corrosion of metal surfaces. More particularly, this invention relates to the treatment of metals with certain aluminum salts whereby a thin layer of the salt is deposited on the surface of the metal to form a corrosion resistant plastic envelope capable of inhibiting or preventing corrosion under adverse atmospheric conditions such as salt, air and atmosphere contaminated with industrial gases.

Various metals such as iron, steel, other ferrous metals, non-ferrous metals, metal alloys, and the like, are subject to the corrosive and oxidative effect of air, moisture, salt brines, acids, industrial gases, such as $SO_2$ and $SO_3$, and the like. It is well known that such metal surfaces can be protected against these and other corrosive media by treatment with various chemical rust and corrosion inhibitor compositions of matter and that there are a large number of corrosion inhibitor compositions sold in commerce. These corrosion inhibitors, however, differ sharply in their efficiency and since none of the chemical corrosion inhibitors is considered optimum, industry is constantly searching for better and more economic corrosion inhibitors to perform this necessary function of protecting metal surfaces from attack by corrosive agents.

It has now been discovered that certain aluminum salts when coated on metal surfaces act as excellent corrosion inhibitors over a prolonged period of time. The novel corrosion inhibitors of this invention comprise aluminum salts of alkarylated aliphatic acids or alkyl aryl alkanoic acids in accordance with the following general formula

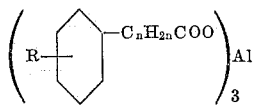

wherein $n$ is an integer from 1 to 3 and wherein R is a straight or branched alkyl group of from 6 to 18 carbon atoms. Specific examples of suitable compounds coming within the scope of the above described formula are aluminum nonyl phenyl acetate, aluminum dodecyl phenyl acetate, aluminum cetyl phenyl acetate, aluminum n-octyl phenyl butyrate, aluminum decyl phenyl propionate, aluminum hexyl phenyl acetate, aluminum hexadecyl phenyl propionate, and the like. Other examples of R include isohexyl, n-heptyl, isooctyl, tridecyl, and the like.

The alkaryl portion of the aluminum salt of this invention may be obtained by any conventional process. Commercially, however, alkylated aromatics of this type are usually prepared by reacting an olefin with benzene in the presence of a Lewis acid catalyst such as aluminum chloride. The alkylating olefin may be straight chained or highly branched such as obtained via a UOP propylene polymerization process. A typical well-known alkyl aromatic compound also used as an intermediate in surfactant manufacture is dodecyl benzene prepared by reacting highly branched tetrapropylene with benzene in the presence of aluminum chloride. The alkyl benzene then may be chloroalkylated to attach an alkyl halide group, e.g. —$CH_2Cl$ onto the benzene nucleus which may then be converted to the nitrile and subsequently by hydrolysis to the carboxylic acid. The carboxylic acid is then converted to its aluminum salt in a known manner. This is easily accomplished by forming the sodium salt of the acid with sodium hydroxide and subsequently reacting the sodium salt with alum. Aluminum, being a trivalent metal, will form the salt of the acid in an aluminum to acid molar ratio of 1:3. Salts of this nature are known in the art and no claim is made herein as to the novelty of the salt per se or its method of manufacture. Since the aluminum salt is a tacky solid, it cannot be efficiently applied to the metal as a thin coating without dilution. It is therefore preferably dissolved in an evaporating solvent boiling below the lubricating oil range, viz. below a temperature exceeding 300° C. (572° F.). It is important that the solvent evaporate over a reasonably short period of time to leave a thin uniform aluminum salt coating on the metal which has been treated. Advantageously, the solvent should completely evaporate within 1 to 600 minutes and should be essentially inert to both the metal surface to be treated and the aluminum salt. The particular solvents employable are well known for this general use and include polar and non-polar vehicles which are easily spread over metal surfaces. The preferred liquid vehicles boil below about 500° F. and more preferably below about 350° F. An initial boiling point of about 125° F. is considered to be a reasonable minimum. The liquid vehicle may comprise a single compound or mixtures thereof including n-hexane, trimethyl pentane, tetramethylbutane, dimethylhexane, dodecane, ethylcyclohexane, isopropylcyclohexane, p-xylene, o-xylene, m-xylene, cumene, petroleum naphtha, mineral spirits, kerosene, gas oil, gasoline, turpentine; halogenated hydrocarbons such as ethylene dichloride, trichloropropylene, propyl chloride, butyl chloride, chlorinated kerosene, alcohols such as methyl, ethyl, propyl, isopropyl, butyl, amyl, hexyl, cyclohexyl, heptyl, methylcyclohexyl, octyl, and the like; polyhydric alcohols, such as glycols, glycerols, etc.; esters of monohydric alcohols and aliphatic mono and dicarboxylic acids such as oleic, ricinoleic, adipic, sebacic, succinic, phthalic acids. Ketone solvents such as acetone, methylethylketone, methylisobutyl ketone and the like are less preferred due to the relative insolubility of the aluminum salts in these vehicles.

While numerous solvents may be employed as vehicles for the novel aluminum salt corrosion inhibitor of this invention, it is to be understood that the primary function of the solvent is to act as a vehicle which will evaporate within a reasonably short period of time, leaving a thin layer of aluminum salt on the metal surface. The aluminum salt may in fact be present in the layer ranging from monomolecular to 0.2 mil.

In the following Table I are listed some typical commercially available solvents with their respective specifications which are suitable as vehicles.

TABLE I.—ALIPHATIC SOLVENTS

| Test | Iosol 1520 | Esso Process Naphtha | Esso V.M. & P. Naphtha | Varsol B | Varsol High Flash | Esso Hexane | Esso Heptane | Laktane | Esso Solvent No. 1 | Esso Solvent No. 5 | Varsol 1 | Varsol 2 | Varsol 3 |
|---|---|---|---|---|---|---|---|---|---|---|---|---|---|
| Composition, vol. percent: | | | | | | | | | | | | | |
| Aromatics | 2–3 | 10.9 | 16.0 | 15.0 | 10.2 | 0.1 | 2.3 | 19.9 | 9.4 | 6.8 | 15.8 | 30.4 | 2.8 |
| Olefins | 0.3 | 0.5 | 0.5 | 1.0 | 1.0 | 0.1 | 0.6 | 0.6 | 0.7 | 0.4 | 0.4 | 0.5 | 0.9 |
| Saturated hydrocarbons | 97–98 | 89.6 | 83.5 | 84.0 | 88.8 | 99.8 | 97.1 | 79.5 | 89.9 | 92.8 | 83.8 | 69.1 | 96.3 |
| Naphthenes | 29 | 48.0 | 35.8 | 38.4 | 30.4 | 22.2 | 52.5 | 66.1 | 32.5 | 33.6 | 27.6 | 29.7 | 46.1 |
| Paraffins | 69 | 41.6 | 47.7 | 45.6 | 58.4 | 77.6 | 44.6 | 13.4 | 57.4 | 59.2 | 56.2 | 39.4 | 50.2 |
| Distillation, °F.: | | | | | | | | | | | | | |
| IBP | 150 | 203 | 248 | 319 | 329 | 151.3 | 201.0 | 217.9 | 130 | 160 | 320 | 327 | 318 |
| Dry point | 200 | 230 | 286 | 378 | 378 | 156.9 | 209.8 | 228.0 | 236 | 279 | 378 | 394 | 348 |
| Evaporation rate,* seconds: | | | | | | | | | | | | | |
| 10 wt. percent | 7 | 14 | 30 | 280 | 300 | 5 | 10 | 16 | 7 | 14 | 220 | 290 | 180 |
| 50 wt. percent | 38 | 67 | 175 | 1,600 | 1,710 | 26 | 50 | 78 | 34 | 76 | 1,250 | 1,500 | 990 |
| 100 wt. percent | 110 | 150 | 430 | 4,080 | 4,950 | 80 | 140 | 180 | 120 | 255 | 4,400 | 6,000 | 2,460 |
| Specific gravity, 60/60° F | 0.7093 | 0.7483 | 0.7665 | 0.7874 | 0.7775 | 0.6806 | 0.7298 | 0.7745 | 0.7047 | 0.7279 | 0.7870 | 0.8072 | 0.7732 |
| °API gravity, 60/60° F | 68.0 | 57.6 | 53.1 | 48.2 | 50.5 | 76.4 | 62.4 | 51.2 | 69.3 | 62.9 | 48.3 | 43.8 | 51.5 |

AROMATIC SOLVENTS

| Test | Solvesso Toluol | Solvesso Xylol | Solvesso 100 | Solvesso 150 | Heavy Aromatic Naphtha |
|---|---|---|---|---|---|
| Composition, vol. percent: | | | | | |
| Toluene | 99.4 | 1.9 | 0.0 | 0.3 | |
| Xylenes | | 95.7 | 0.0 | 1.7 | |
| C⁹ aromatics | | 1.4 | 88.1 | 0.0 | |
| C¹⁰ aromatics | | | 7.6 | 46.1 | |
| C¹¹ aromatics | | | 0.0 | 21.1 | |
| Indans | | | 2.3 | 11.2 | |
| Heavier aromatics | | | 0.0 | 16.1 | |
| Total aromatics | 99.4 | 99.0 | 98.0 | 96.5 | 84.1 |
| Distillation, °F.: | | | | | |
| IBP | 230.2 | 280.9 | 321 | 369 | 358 |
| Dry point | 231.9 | 287.3 | 349 | 406 | |
| Evaporation rate, seconds: | | | | | |
| 10 wt. percent | 23 | 70 | 250 | 1,150 | 4,320 |
| 50 wt. percent | 105 | 360 | 1,325 | 5,950 | 46,800 |
| 100 wt. percent | 254 | 800 | 2,880 | 15,000 | |
| Specific gravity, 60/60° F | 0.8702 | 0.8708 | 0.8756 | 0.8922 | 0.9346 |
| °API gravity, 60/60° F | 31.1 | 31.0 | 30.1 | 27.1 | 19.9 |

*Fed. of Societies for Paint Technology Method II.
The terms Esso, Laktane, Solvesso, and Varsol are trademarks registered in the U.S. Patent Office.
The term Iosol is a trademark registered in the Canadian Patent Office.
The term Solvesso is a trademark registered in the U.S. Patent Office.

The aluminum salt of this invention should be solubilized in the liquid vehicle prior to application to the metal surface being treated. The aluminum salt can be present in the evaporating vehicle in any amount sufficient to insure deposition of a corrosion inhibiting amount of aluminum salt on the metal surface upon evaporation of the liquid vehicle. Usually the aluminum salt is present in an amount from 0.5–10 wt. percent, preferably between 1–5 wt. percent. The salt may be applied to the metal by dipping the metal in the corrosion inhibitor composition by spraying or brushing the aluminum salt containing composition on the metal or by other equivalent means.

The aluminum alkyl phenyl alkanoates of this invention are either soluble in the solvents referred to or form a very thin sol, whereas many of the prior art corrosion inhibiting salt compositions are either insoluble or form a heavy gel which makes difficult the application of the corrosion inhibitor to the metal. The most economic and preferred technique for preventing corrosion of ferrous or other metals is to deposit a uniform thin layer of the corrosion inhibitor salt on the metal. This cannot be readily accomplished if the corrosion inhibiting salt composition is either in the form of a heavy gel or a viscous tacky solution.

To demonstrate the comparative effectiveness of the corrosion inhibitor composition of this invention, reference is now had to the following example.

EXAMPLE 1

In this test freshly polished mild steel SAE 1020 open hearth, cold rolled test plates 3¼" x 1" x ¹⁄₁₆" were dipped in the corrosion inhibiting compositions specified and then hung outside exposed to an industrial atmosphere during the winter months. The results are shown in the table below.

TABLE II

| Plate No. | Dipped in— | Appearance of plates after— | | | | | |
|---|---|---|---|---|---|---|---|
| | | 48 hr. | 168 hr. | 2 wk. | 3 wk. | 3 mo. | 4 mo. |
| 1 | Blank | Many rust spots. | 90% rusted | 100% rusted | | | |
| 2 | 1.75% zinc naphthenate [1] in Iosol 1520. | Rust spots | 5% rusted | 90% rusted | 100% rusted | | |
| 3 | 1.50% aluminum naphthenate [1] in Iosol 1520. | Clean | Clean | Clean | Clean | Rust spots | Large areas of corrosion. |
| 4 | 3.0% ADPA [2] in Iosol 1520 | do | do | do | do | Clean | A few tiny spots. |

[1] This represents the maximum useful concentration of the particular corrosion inhibiting salt due to gelling. The corrosion inhibiting salt was added to the solvent until a gelatinous tacky composition was reached at the concentrations indicated. Due to the tackiness of the corrosion inhibiting composition, a greater weight percent of the active ingredient was deposited on the steel test plates than in the case of aluminum dodecyl phenyl acetate of test number 4.

[2] Aluminum salt of dodecyl phenyl acetic acid.

While the aluminum salts of this invention are excellent corrosion inhibitors, there is a tendency for these aluminum salts when maintained in a solvent solution to deteriorate or degrade and to lose their effectiveness as corrosion inhibitors. It is therefore recommended that the aluminum salt be deposited on the metal to be protected from a salt solution, which has been freshly prepared. To demonstrate this deterioration, reference is now had to the following table which compares the corrosion resistant properties of a freshly prepared aluminum salt in solvent with an aluminum salt solvent solution which has been aged for over six weeks.

TABLE III

| Plate No. | Dipped in— | Appearance of plates after— | | | | | |
|---|---|---|---|---|---|---|---|
| | | 48 hr. | 96 hr. | 192 hr. | 3 wk. | 3 mo. | 4 mo. |
| 1 | 3.0% ADPA in Iosol 1520 (fresh sol'n). | Clean | Clean | Clean | Clean | Clean | A few rust spots. |
| 2 | 3.0% ADPA in Iosol 1520 (sol'n aged 6 wks. before use). | do | Spots | 40% rusted | 50% rusted | 100% rusted | |

As an alternative to employing freshly mixed solutions, conventional stabilizers may be used as additives to permit the lengthy storage of the aluminum salt-solvent solution.

What is claimed is:

1. A corrosion inhibiting composition of matter which comprises a corrosion inhibiting amount of an aluminum salt of an alkyl phenyl alkanoic acid of the generic formula:

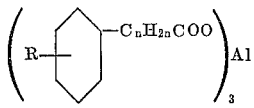

wherein $n$ is an integer of from 1 to 3 and wherein R is an alkyl group of from 6 to 18 carbon atoms as an active ingredient and an essentially inert organic evaporating liquid vehicle therefor, said liquid vehicle boiling below a temperature exceeding 572° F.

2. A composition in accordance with claim 1 wherein said liquid vehicle has a boiling range within the range of 125 to 500° F.

3. A composition in accordance with claim 1 wherein said active ingredient is an aluminum salt of dodecyl phenyl acetic acid.

4. A composition according to claim 1 wherein said aluminum salt is present in a weight concentration ranging from 0.5 to 10 weight percent.

5. A composition according to claim 1 wherein said aluminum salt is present in a weight concentrating ranging from 1 to 5 weight percent.

6. A method of preventing corrosion of metal surface which comprises contacting said metal surface with a solution containing a corrosion inhibiting amount of an aluminum salt of an alkyl phenyl alkanoic acid of the generic formula:

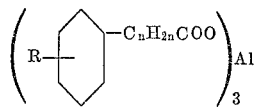

wherein $n$ is an integer of from 1 to 3 and wherein R is an alkyl group of from 6 to 18 carbon atoms as an active ingredient in an organic evaporating liquid vehicle which is essentially inert to both said metal surface and said aluminum salt and boils below a temperature exceeding 572° F. and thereafter evaporating said vehicle to form a uniform thin layer of said aluminum salt on said metal surface.

7. A method according to claim 6 wherein said evaporating liquid has a boiling range within the range of 125 to 500° F.

8. An article of manufacture comprising a metal subject to corrosion having coated on the surface thereof a corrosion inhibiting amount of an aluminum salt of an alkyl phenyl alkanoic acid of the generic formula:

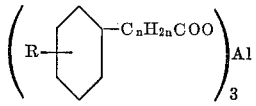

wherein $n$ is an integer of from 1 to 3 and wherein R is an alkyl group of from 6 to 18 carbon atoms.

9. An article of manufacture according to claim 8 wherein said aluminum salt is present as a uniform film having an average thickness ranging from the monomolecular thickness of said aluminum salt to 0.2 mil.

No references cited.

ROBERT F. WHITE, *Primary Examiner.*

ALEXANDER H. BRODMERKEL, *Examiner.*